Apr. 17, 1923.

A. A. TOWERS

VEHICLE TOP

Filed Feb. 10, 1921

INVENTOR

Arthur Alderton Towers,

Attorney

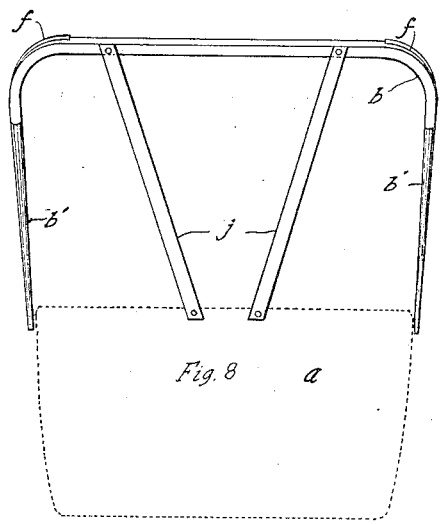
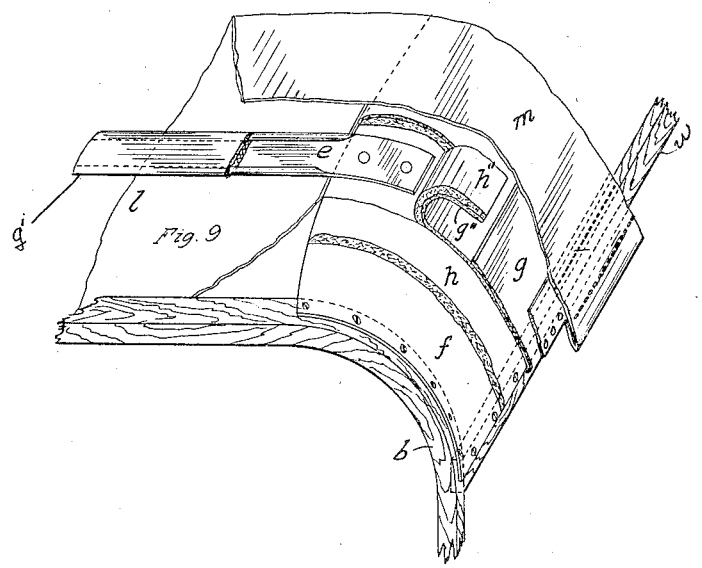

Patented Apr. 17, 1923.

1,452,328

UNITED STATES PATENT OFFICE.

ARTHUR ALDERTON TOWERS, OF CLEVELAND, OHIO.

VEHICLE TOP.

Application filed February 10, 1921. Serial No. 443,860.

*To all whom it may concern:*

Be it known that I, ARTHUR ALDERTON TOWERS, a subject of the King of England, residing at Cleveland, in the county of Cuyahoga and State of Ohio, have invented certain new and useful Improvements in Vehicle Tops, of which the following is a specification.

My invention relates to improvements in vehicle tops, and has for its object the provision of a light and strong top construction for automobiles, that is better and cheaper than those of the prior art, and which avoids certain disadvantages inherent in such structures.

The more commonly used automobile top has comprised a suitable covering supported at intervals above the body by a series of transverse wooden bows. Continued use of a top of this character, particularly if it has been put up and down at frequent intervals, causes a cracking of the material of the top covering and a sagging thereof between the supporting bows.

A later type of automobile top comprised a shaped and mortised wooden frame of numerous skillfully fittted wooden parts, that may be somewhat likened to an inverted frame or skeleton of a shallow, flat-bottomed boat; over which inverted frame the fabric covering was fitted and secured. This style of permanent top is acknowledged to be quite satisfactory, but its expense is considerable and its structure somewhat bulky, if not heavy.

It has been my purpose to provide a satisfactory substitute for the types of automobile top, which shall be cheaper and more easily made, while avoiding certain disadvantages attributable to the older forms in use prior to my present invention. This improved vehicle top comprises essentially a contoured metallic skeleton frame about which the lining and padding are assembled, and over these the fitted waterproof fabric covering is secured. This frame comprises essentially continuous coved sheet metal members forming the sides, terminally united with front and rear transverse connecting members, which together form a light rigid frame, preferably equipped with peripheral attaching strips for the covering fabric. The particular features and details of my improved construction may best be explained in connection with the accompanying drawings illustrating one embodiment of my invention, wherein:—

Fig. 8 is a rear view of the braced bow and Fig. 9 is an enlarged fragment partially in section and partially broken away, illustrating the details of the top construction.

Throughout the several figures of the drawings I have employed the same character of reference to indicate similar parts.

Figure 1:
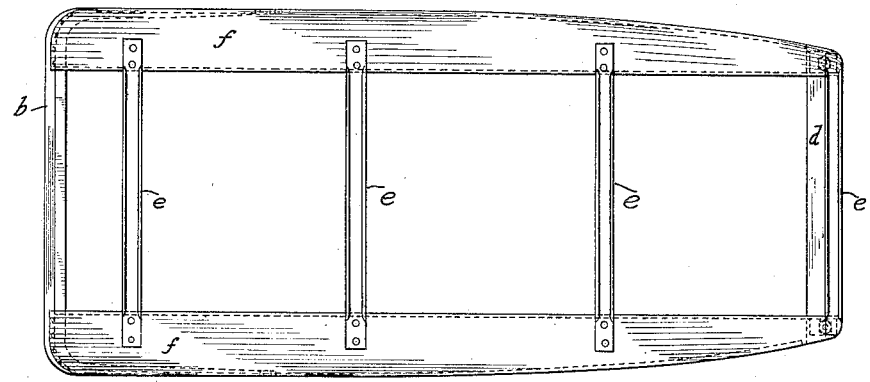
Fig. 1 is a plan view of the particular frame structure in question, omitting all of the lining, padding and covering in order better to illustrate the frame structure.
Figure 2:
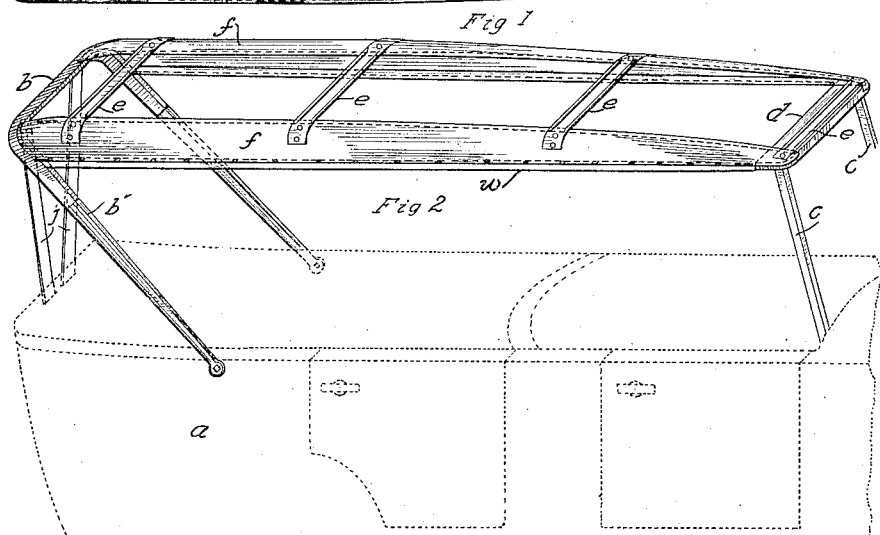
Fig. 2 is a perspective view of said frame; the body of the vehicle being indicated by dotted lines.
Figures 3, 4, 5, 6, 7:
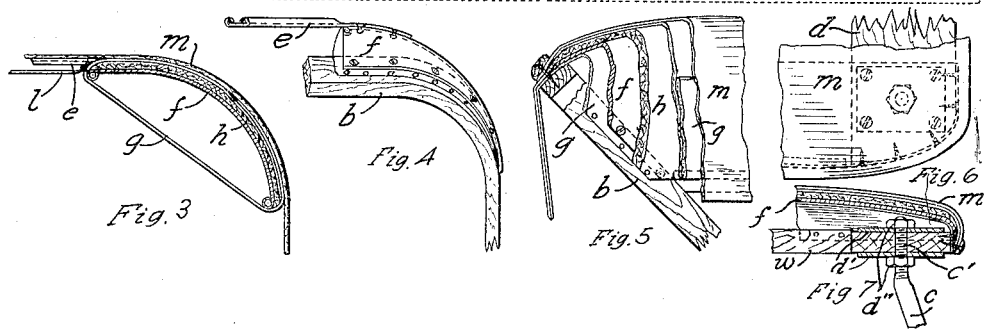
Fig. 3 is an enlarged detail showing the coved side piece, linings and covering in fragmentary cross section; the thicknesses necessarily being exaggerated.
Fig. 4 is a fragmentary end view of the bow and coved sheet metal member.
Fig. 5 is a fragmentary side view showing the bow and associated members successively broken away.
Fig. 6 is a forward fragment of the coved side piece in plan view.
Fig. 7 is a fragmentary section thereof.

Referring first to Fig. 2, it will be seen that the frame is carried upon the body *a* by the rearwardly disposed composite wooden bow *b* and metal socket members *b'*, and forwardly by the uprights *c* which are bolted to the wooden crosspiece *d*. The frame proper comprises the U-sectioned transverse metallic struts *e* which are riveted at intervals to the continuous coved and contoured longitudinal metallic members *f*. These members *f* are suitably secured, as by screws, to the bow *b* and the crosspiece *d* at the rear and front of the top, as shown in Figs. 4 and 6. The foregoing members constitute the skeleton of my improved top, which principally consists of relatively light and suitably shaped sheet steel members adapted and proportioned to the needs of different bodies.

It will be understood, however, that this skeleton frame, although exceedingly light, strong and simple in construction, is not adapted for use upon the average pleasure car. In other words, a top comprising this frame and its waterproof covering would not be acceptable to the average automobilist, although combining the essentials of a perfectly serviceable and practicable top.

Accordingly, it is necessary to construct my improved top so that it may have a more pleasing and finished appearance than the skeleton frame presents. However, this is readily accomplished by suitably padding and covering the metallic members in any desired manner, such as I will now explain by way of illustration.

Although different methods of applying the coverings to the skeleton metallic frame above described, may be adopted, I have found that the easiest method is to apply the lining to the individually covered and padded metallic side pieces, after which they are united by riveting the transverse struts thereto, as shown in Fig. 9.

The section of a modified sheet metal side piece, beaded or stiffened along its top and bottom edges, Fig. 3, may first be referred to for explaining the connection of the covering and lining. Thus the fabric covering $g$ is stitched longitudinally to the lining $l$, continuous with the under surface of the top, and a thin overlying layer of padding $h$ is enfolded by the overlapped or abutting stitched edges of said fabric $g$. Thus the entire metallic member or section $f$ is covered exteriorly from end to end. If desired, the struts $e$ similarly may be covered by a light padding $h'$ and wrapper or covering $g'$ as shown in Fig. 9. The padding ordinarily is desirable for protecting the waterproof exterior covering from wear and masking the individual members of the frame and their points of connection, thus giving the top a well rounded substantial effect.

The coved sheet metal members $f$ having been punched in the desired positions for connecting the struts, the fabric and padding are cut away in small sections, as at $g''$, $h''$ Fig. 9, so that the struts may be riveted thereto at intervals, whereupon the sections of padding and fabric may be turned back to cover the joint. The wooden attaching strips $w$ may then be screwed to the lower edge of the side piece on each side of the frame.

Referring more particularly to Figs. 4, 6, 7 and 9, I may now explain in detail how the metallic skeleton is supported from the body. In the first named figure, it will be seen that the sheet metal member $f$ is rearwardly coved, as well as in a lateral direction, to form a curved end portion merging into the bow $b$, whereon each side and end member $f$ is securely screwed. Similarly, the downwardly curved end portions of the sheet metal members $f$ are screwed to the wooden cross piece $d$ at the front of the frame. This, in turn, is supported by the uprights or wind shield brackets $c$ by means of metallic plates $d'$ and nuts $d''$ through which each threaded end $c'$ of member $c$ extends to afford an adjustable securing means for the front of the frame. It will be observed, however, that this novel connection is extremely compact and light.

The frame as thus constructed and mounted, is now ready for fitting the exterior covering $m$ of suitable waterproof fabric. Laterally the fitted cover is provided with a blind securing strip $n$ stitched interiorly thereof in the plane of the side strips $w$ to which it is tacked, while the ends of the covering $m$ are tacked front and back to the wooden strip $d$ and the bow $b$, respectively, as shown in Figs. 5, and 7. Frequently it is desirable to stay the top against side sway, for which purpose I provide the diagonal strap iron members $j$ connecting the bow $b$ and body.

The lining $l$, in addition to its attachment at either side to the fabric covering $g$ of the combined side and end pieces, may also be attached at the ends of the frame, as indicated in Fig. 9.

It may be explained that the construction herewith shown and described is open to considerable necessary modification to meet the needs of various vehicles and bodies. Thus the combined side and end members of sheet metal may be of such length and shape as required, and may be secured by suitable struts of any suitable material, while the peripheral attaching means may take such form as is demanded by various styles and types of top; all within the limits and intent of my present invention as herein set forth by way of specific illustration.

Having now described the preferred embodiment of my invention, I claim as new and desire to secure by Letters Patent, together with such modifications thereof as may be made by those ordinarily skilled in the art, the following:—

1. In a frame for vehicle tops, the combination with two laterally curved sheet metal members forming continuous side pieces of said frame, of transverse struts secured at intervals for rigidly uniting the same, and means adjacent to the ends of said side pieces for supporting the frame from the vehicle body, substantially as set forth.

2. In a frame for vehicle tops, the combination with two contoured laterally curved sheet metal members forming the side pieces of said frame, of transverse struts secured at intervals between said side pieces for uniting the same, and means peripherally positioned with respect to the frame whereon the waterproof top may be secured thereon, substantially as set forth.

3. In a frame for vehicle tops, the combination with two contoured laterally curved sheet metal members forming continuous side pieces of said frame, of a plurality of stiffened sheet metal struts secured at intervals between said side pieces for rigidly uniting the same, means for supporting the frame from the vehicle body, and diagonal bracing means connected at the rear of the frame, substantially as set forth.

4. In a frame for vehicle tops, the combination with continuous coved sheet metal side members, of connecting transverse struts uniting the same, and means provided peripherally of the frame whereby to secure a water proof top thereon, substantially as set forth.

5. In a frame for vehicle tops, the combination with continuous coved sheet metal side members, of connecting transverse struts uniting the same, wooden strips secured to the sheet metal members substantially the lengths thereof, and connecting wooden end pieces transversely uniting said sheet metal members, substantially as set forth.

6. In a vehicle top construction, the combination with its supporting frame comprising continuous coved sheet metal side members, transverse struts and end pieces uniting said metallic side members, and wooden attaching strips secured thereto, of a waterproof fabric covering closely fitting the frame and peripherally secured thereto by means of said end pieces and attaching strips, substantially as set forth.

7. In a vehicle top construction, the combination with its supporting frame comprising coved sheet metal side members, transverse struts and end pieces uniting said metallic side members, and wooden attaching strips secured thereto, of an inner fabric lining for said frame, superposed padding upon said side members, and a waterproof fabric covering closely fitting the completed frame and secured to the attaching strips, substantially as set forth.

8. In a permanent top for vehicles, the combination with continuous coved sheet metal members forming the lateral members of a supporting frame, of front and rear members terminally uniting said lateral members, associated means for attaching the top fabric to said members, and supports mounted adjacent to the front and rear of the car body and connected adjacent to the corners of the frame, adapted to support the top and afford free access and unobstructed view along both sides of the car, substantially as set forth.

In testimony whereof I do now affix my signature.

ARTHUR ALDERTON TOWERS.